(No Model.)
F. M. McCARTEA.
FARRIER'S KNIFE.
No. 567,493. Patented Sept. 8, 1896.
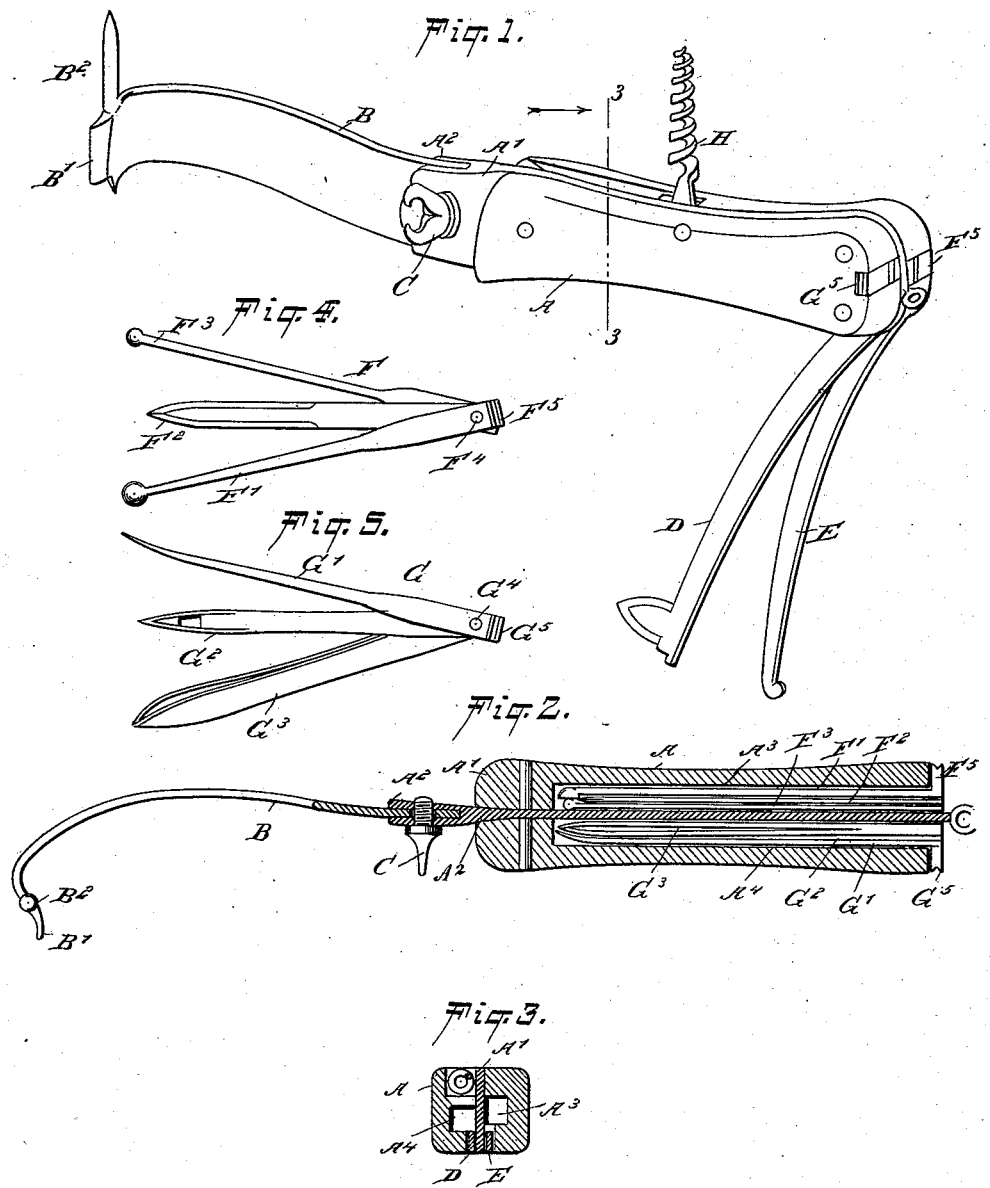
WITNESSES:
William P. Goebel
Theo. G. Hoster
INVENTOR
F. M. McCartea
BY
Munn & Co
ATTORNEYS

UNITED STATES PATENT OFFICE.

FRANCIS M. ME CARTEA, OF SAN JUAN, CALIFORNIA.

FARRIER'S KNIFE.

SPECIFICATION forming part of Letters Patent No. 567,493, dated September 8, 1896.

Application filed July 20, 1895. Serial No. 556,603. (No model.)

*To all whom it may concern:*

Be it known that I, FRANCIS M. ME CARTEA, of San Juan, in the county of San Benito and State of California, have invented a new and Improved Farrier's Knife, of which the following is a full, clear, and exact description.

The object of the invention is to provide a new and improved knife, more especially designed for the use of farriers and veterinary surgeons, to enable them to operate on horses' feet with great ease and accuracy.

The invention consists principally of a handle carrying a curved blade for planing the bottom of a hoof and terminating at its outer end in a mud-scraper and a hook for cleaning out the seam on the bottom of the hoof.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a perspective view of the improvement. Fig. 2 is a sectional plan view of the same. Fig. 3 is a cross-section of the same on the line 3 3 of Fig. 1. Fig. 4 is a side elevation of the combination sounder or probe, mud-spoon, and lance; and Fig. 5 is a like view of the combination tweezers, hoof-pick, and needle.

The improved farrier's knife is provided with a suitably-constructed handle A, provided with a central plate A', formed at its outer end into a socket $A^2$, adapted to receive the rear end of the knife-blade B, secured in the said socket by a thumb-screw C, as is plainly illustrated in Fig. 2. The knife-blade B is curved and terminates at its outer curved end in an angularly bent mud-scraper B', for conveniently scraping off the mud on the bottom or sole of a horse's foot, it being understood that such mud accumulating on the foot of a horse becomes very hard and is removed with great difficulty by ordinary means, but by the use of this scraper B' can be readily detached. On the outer end of the blade B is also formed an upwardly-extending hook $B^2$, for cleaning out the seam on the bottom of a horse's hoof, the said hook being also adapted for use as a pick, to loosen the mud previous to scraping it off by the scraper B'. The hook $B^2$ is well adapted for cleaning out the side of the frog of the foot and the crease connecting the shell with the sole of the foot, and in which crease collects sand and gravel, which must be removed preparatory to paring or planing the bottom of the foot with the blade B. Thus the cutting-edge of the blade B is not liable to come in contact with substances—such as sand and gravel—which would dull the edge of the blade.

On the rear end of the handle A are pivoted a bleeding-knife D and a searching-tool E, adapted to fold into recesses in the handle of the knife on opposite sides of the center plate A'. (See Fig. 3.) The tools D and E can be swung outwardly into an approximately right-angled position relatively to the handle A, so as to be in a convenient position for use.

In the handle A are formed longitudinally-extending chambers $A^3$ and $A^4$ on opposite sides of the center plate A' and above the recess for the tools D and E, as plainly shown in Fig. 3, the said chambers opening at the rear end of the handle to the outside to receive the combination-tools F and G. (Shown in detail in Figs. 4 and 5.)

The combination-tool F is provided with a mud-spoon F', a lance $F^2$, and a sounder or probe $F^3$, all being pivotally connected with each other at their rear ends by a pivot $F^4$, so that either of the said tools can be opened out for use whenever required. The rear end of the mud-spoon F' is provided with a right-angular projection or flange $F^5$, adapted to fit into a recess at the end of the chamber $A^3$ to permit the operator to conveniently withdraw the combination-tool F from the chamber $A^3$ whenever it is desired to make use of any one of the three tools F' $F^2$ $F^3$. The other combination-tool G is provided with a hoof-pick G', a needle $G^2$, and tweezers $G^3$, all pivotally connected with each other at their rear ends by a pivot $G^4$, so that either of the tools can be opened out for use. The pivot end of the hoof-pick G' is formed with a flange $G^5$, similar to the flange $F^5$, and likewise adapted to fit into a recess on the outer end of the chamber $A^4$, to permit the operator to conveniently withdraw the tool G from the said chamber whenever it is desired to make use of any of the tools G' G² G³.

On the top of the handle A is pivoted a corkscrew H, adapted to stand at right angles to the handle when in use and adapted to fold into a recess on the top of the handle.

It will be seen that by the arrangement described every means for sounding corns, &c., in the hoof, for removing sand, gravel, mud, and the like, for paring and removing undesirable growths, &c., is provided, rendering the tool very useful for veterinary surgeons and farriers.

By reference to Fig. 1 it will be seen that the blade is curved or bent slightly outward or to one side for part of the length and is then curved or bent in the opposite direction, the end or point of the blade being curved slightly inward. By this arrangement the knife can be conveniently held in position for properly paring the animal's hoof, at the same time obtaining all the necessary purchase power while wielding the knife and owing to the above-mentioned curve given to the blade. As the knife blade is set forward edgewise, it gives the blade a straight draw and great purchasing power to cut with.

Having thus fully described my invention, I claim as new and desire to secure by Letters Patent—

1. A farrier's knife, comprising a handle, a blade connected with said handle and having an outer-curved end, and a spur-shaped hook projecting from the back of the blade at the curved end thereof, substantially as shown and described.

2. A farrier's knife, comprising a handle, a laterally-curved blade removably connected with the said handle, a scraper projecting laterally from the end of the blade, and a hook formed on the back of the blade at the outer end, substantially as shown and described.

3. A farrier's knife, comprising a handle, a curved blade connected with the handle, the said blade having its end curved slightly inward in direction of the handle and then outwardly forming a laterally-projecting scraper, and a hook projecting from the back of the blade, substantially as shown and described.

4. A farrier's knife, comprising a handle provided with a central longitudinal plate, having a forked outer end projecting beyond the front end of the handle and forming a socket for the reception of a blade, the said handle having chambers formed therein at opposite sides of the said plate, the said chambers opening at the rear end of the handle, the said handle being provided with a recess at the outer side of each chamber at the rear end of said handle, and combination-tools composed of members pivoted together and adapted to be inserted in each of said chambers, each combination-tool having one of its members provided with a flange extending at right angles from the pivot end and adapted to fit in the recess at the end of the handle, substantially as shown and described.

FRANCIS M. ME CARTEA.

Witnesses:
F. S. WALLACE,
F. W. KEMP.